United States Patent [19]

Lindblad et al.

[11] Patent Number: 5,358,973
[45] Date of Patent: Oct. 25, 1994

[54] COMPOSITION AND METHOD FOR PREVENTION OF ADHESIONS BETWEEN BODY TISSUES

[76] Inventors: Gert Lindblad, Gosselmansgatan 1, S-271 33 Ystad; Peter Buckley, Gläntvägen 5, S-752 56 Uppsala, both of Sweden

[21] Appl. No.: 982,854

[22] Filed: Nov. 30, 1992

Related U.S. Application Data

[62] Division of Ser. No. 585,064, Oct. 22, 1990, Pat. No. 5,190,759.

[30] Foreign Application Priority Data

Feb. 21, 1989 [SE] Sweden ............................ 8900586

[51] Int. Cl.$^5$ ............... A01N 25/04; A01N 43/04; C07H 5/04; C08B 37/02
[52] U.S. Cl. ........................ 514/777; 514/54; 514/59; 514/784; 536/55.1; 536/112; 424/423; 424/426; 424/488
[58] Field of Search ............ 536/55.1, 112; 424/422, 424/423, 426, 488; 514/54, 59, 777, 784

[56] References Cited

U.S. PATENT DOCUMENTS

| | | | |
|---|---|---|---|
| 4,840,626 | 6/1989 | Linsky | 604/364 |
| 4,886,787 | 12/1989 | de Belder et al. | 514/57 |
| 4,889,722 | 12/1989 | Sheffield | 424/450 |
| 4,911,926 | 3/1990 | Henry | 424/426 |
| 4,937,254 | 6/1990 | Sheffield | 514/420 |

*Primary Examiner*—Thurman K. Page
*Assistant Examiner*—Carlos Azpuru
*Attorney, Agent, or Firm*—Fred Philpitt

[57] ABSTRACT

A composition for use in surgical operations to prevent adhesions between tissue surfaces, comprising an aqueous solution containing dextran in an amount of 7 to 20% and hyaluronic acid in an amount of 0.5 to 6%, the dextran having a weight average molecular weight within the range of 30,000 to 75,000 and the hyaluronic acid having a weight average molecular weight within the range 500,000 to 6,000,000.

2 Claims, No Drawings

COMPOSITION AND METHOD FOR PREVENTION OF ADHESIONS BETWEEN BODY TISSUES

This is a division of application Ser. No. 07/585,064, filed Oct. 22, 1990, now U.S. Pat. No. 5,190,754.

This invention relates to novel compositions containing a combination of hyaluronic acid and dextran and to their use as an agent for preventing adhesions, e.g. in order to avoid problems caused by unwanted adhesions between tissue surfaces.

Many surgical operations are complicated by the formation of unwanted adhesions between body tissues. Indeed, the effective prevention of adhesions is often an essential prerequisite for the ultimate success of the surgical procedure. Examples of surgery where adhesions are common and troublesome complications include abdominal surgery, where peritoneal adhesions between the intestines and/or abdominal wall may seriously impair gastrointestinal function; in urogenital surgery, where adhesions may occlude or otherwise impair the normal function of the ureters, bladder, uterus, fallopian tubes, etc, and in neurosurgery, where excessive granulation tissue may affect nerve function. In tendon surgery, the tendon and its sheath or other adjacent tissue will often tend to grow to a state of mutual adhesion during the postoperative period of immobilization and healing.

Considerable efforts have been made, without success, to prevent this problem by using various suturing techniques and passive movement of the tendon during the healing process. In microsurgery of the eye and inner ear, too, the prevention of adhesions may be of paramount importance. In thoracic and open heart surgery, the number of re-operation cases has been increasing, which has particularly highlighted the problem of pericardial and retrosternal adhesions. After heart surgery, adhesions often form between the epicardium and surrounding structures such as the pericardium, mediastinal fat, pleura and sternum. These adhesions make re-operations both difficult and hazardous. They increase the risk of damage to the heart during resternotomy and obscure the underlying coronary anatomy. Tight pericardial adhesions may also tend to cause coronary artery narrowing and to thus impair myocardial function.

One way of trying to prevent adhesions is based on holding apart the surfaces of tissues for a sufficient period of time after surgery. This can be achieved by placing some form of a barrier between the surfaces. Later this barrier can be removed either by a minor operation or, preferably, by natural in vivo degradation and phagocytosis.

One example of such a suitable barrier with inbuilt biodegradability is given in Swedish patent 456346 which describes a biocompatible gel of hyaluronic acid.

The above mentioned gel or film is one example of a material having a reasonable degree of mechanical strength. But in some cases, for example in hip surgery, demands in this respect are greater and a number of synthetic materials such as prostheses of plastic or titanium etc have been developed for such applications.

In other cases, however, it may be difficult to apply a pre-shaped material so that it covers all essential surfaces; and it may be especially difficult to hold such a material in place for a sufficiently long period of time. In such situations materials in liquid form are preferable.

Among the substances in liquid form which have been advocated and tested as adhesion prophylaxis agents, certain polysaccharides deserve special mentioning, especially glycosaminoglycans such as hyaluronic acid.

Hyaluronic acid is available within a wide molecular weight interval, depending upon the source material and purification method. Highly purified hyaluronic acid of a weight average molecular weight ($\overline{M}_w$) exceeding 750,000 is described by Balazs in U.S. Pat. No. 4,141,973 and a hyaluronic acid preparation of a $\overline{M}_w$ of about 3 millions (Healon ® from Pharmacia AB, Uppsala, Sweden) is commercially available.

In the patent mentioned above (U.S. Pat. No. 4,141,973), Balazs indicates a number of applications for the product, including its use to prevent adhesions, and refers to some of the medical applications mentioned above. Hyaluronic acid has also been tested in various experimental models such as that of Weiss C et al (1986) which revealed good results in experimental tendon surgery. No adhesions were found in 55% of the treated group whereas only 5% of the control group were adhesion-free. Hyaluronic acid also had a pronounced effect on the nature of the adhesions—strong adhesions formed in only 18% of the treated group but in 62% of the controls.

Dextran is another polysaccharide which appears to reduce the risk of tissue adhesions in some models. This substance is well known in several therapeutic applications, e.g. as an important component of intravenous infusion solutions.

Among experimental studies which have been performed to investigate this effect of dextran, a trial by R. J. Robinson et al 1984 on prevention of pericardial adhesions is worthy of special mention. The work was performed on rabbits, whereby one group received intrapericardially 6% dextran 70 (Macrodex from Pharmacia AB, Uppsala, Sweden) and another operated group served as controls. Complete absence of adhesions was noted in 70% of cases in the dextran group, compared with only 10% in the control group.

It is thus clear that prior art literature indicates that both hyaluronic acid and dextran are able to reduce the risk of postoperative adhesion complications. In certain very complicated surgical operations, however, the possibility of achieving a final success may be greatly reduced, down to zero, due to adhesion formation. In such cases, an only partial reduction of this risk is not clinically sufficient; every effort must thus be made to completely eliminate this risk.

In this connection we have particularly studied pericardial adhesions in an attempt to resolve this problem. The experimental evaluation has been performed on a rabbit model analogous to that used by R. J. Robinson et al (1984) but with some very important differences: First, we induced a more pronounced standard tissue injury; and, secondly, we submitted the exposed surfaces to longer and more intensive drying. The subsequent experiments yielded very interesting results—it was evident that hyaluronic acid had a good effect (but did not prevent adhesions in all cases) whereas dextran in our standardized model provided no protection at all.

A composition containing both dextran and hyaluronic acid provided virtually complete protection against adhesion in this particular standardized model. The effect was substantially better than that of hyaluronic acid alone and, as mentioned above, dextran alone provided no protection at all. A clear synergistic effect was thus noted.

The present invention relates to a novel composition in liquid form for the prevention of adhesions between body tissues, particularly in surgical operations as, for example, in thoracic or heart surgery. The composition contains dextran and hyaluronic acid or hyaluronate or a derivative such as sulphated or polysulphated hyaluronate, hyaluronate ester (se EP 265 116) or hyaluronate which has been otherwise chemically modified in a minor way, for example as described in U.S. Pat. No. 4,713,448.

We prefer the dextran content of the composition to lie between 1 and 35%, preferably between 4 and 35%, and especially 7 to 20% w/w and the hyaluronate content to lie between 0.5 and 6%, preferably 0.8 to 2%, and especially 0.8-1.5 weight percent, in both cases calculated as percent of the composition. The molecular weights of both dextran and hyaluronic acid may vary within wide limits but the preferred ranges are 30,000-75,000 and 500,000-6,000,000, respectively.

It is known that solutions of high molecular weight dextran may cause anaphylactic reactions on injection and in addition that such reactions can be eliminated or at least minimized by administration of a low molecular weight hapten-dextran. This can be achieved either by preinjection or by simultaneous injection of the monovalent hapten-dextran, see e.g. von Messmer et al (1980). The compositions of this invention may therefore contain additives like hapten-dextran or alternatively such substances may be preinjected. For this reason, in the experimental studies presented below we have added hapten-dextran in a quantity corresponding to 30% of the quantity of high molecular weight dextran contained in the composition.

If it is considered suitable to administer a pharmaceutical drug into the space in which adhesions are to be prevented, this may naturally be performed by adding the drug to the adhesion preventing compositions of the invention. Examples of such additives include local anaesthetics, corticosteroids, etc, etc, which may be expected to thus become effective according to a more or less "slow-release" mode of action.

Naturally, the compositions suitable as adhesion prophylaxis agents may contain other physiologically preferable polysaccharides such as carboxymethylcellulose (CMC), hydroxyethyl starch or other glycosaminoglycans (GAG) so that the above described properties are achieved even if a minor part of the hyaluronic acid or dextran is thus replaced.

The invention furthermore relates to the use of dextran and/or hyaluronate, particularly within the molecular weight limits specified above, for the preparation of compositions for preventing adhesions between body tissues where the contents of the two components in the composition lie within the above specified ranges.

Apart from dextran and hyaluronic acid, the composition contains water and possibly physiologically preferable salts and buffering agents as, for example, sodium chloride and phosphate buffer. Throughout this text the term "hyaluronic acid" has been used as according to general practice, to denote the substance. Naturally hyaluronate (e.g. sodium hyaluronate), which is the actual form at physiological pH values (around pH 7), is considered to be equivalent.

According to a yet further aspect of the invention, we provide a method of preventing adhesions between body tissues, whereby a dextran-hyaluronic acid composition, as specified above, in a quantity suitable for the actual space in which it is to be administered, is implanted in connection with a surgical operation.

EXPERIMENT

Studies on pericardial adhesions were performed on rabbits (Sw Loop, weight 3–35 kg). After the animals had been anesthetized with Hypnorm (1.0 ml/kg; Johnson Pharmaceuticals), the pericardium was exposed by an incision through the breast bone (sternum). The rib cage was held open with the aid of a thorax brace and the pericardium was thereafter opened by means of a 1–1.5 cm incision. Two to four cotton swabs were used to absorb all the fluid present within the pericardium. A Proxa brush No. 622 Butler Long was thereafter used to injure the heart and the wall of the pericardium. The brush was drawn back and forth about 10 times. Thereafter a tube was inserted through the incision and the tissue surfaces were dried by blowing in oxygen at a pressure of 1.5 bar for 10 minutes. Finally, ca 1 ml of autologous blood together with the test composition was inserted into the space between the heart and the pericardium, whereupon the incision was closed with a 7-0 Prolene suture. Thereafter the rib cage, musculature and outer skin were sewed together. The animals were then allowed to waken and live for 2–3 weeks, after which they were killed. The heart was then carfully removed in order to assess the extent to which the surface area of the heart (in percent) adhered to the surrounding pericardium and to assess the degree of adhesions in each instance.

The adhesions were assessed on a scale of 1–4 (1 none, 2 light, 3 considerable, and 4 profuse adhesions).

During postoperative care, 0.3 ml Pethidine ACO was given 2–3 times per day (i.e. every 4–5 hours).

TABLE 1

| Exp. no | Rabbit no | Treatment | Degree of adh | % adh to heart |
|---|---|---|---|---|
| 2 | 1891-8 | Control | 3 (considerable) | 40 |
| 2 | 1892-8 | Control | 3− | 45 |
| 2 | 1893-8 | Control | 3 | 30 |
| 2 | 1894-8 | Control | 2+ − 3 | 30 |
| 2 | 1895-8 | Control | 3 | 30 |
| 2 | 1896-8 | Control | 2 | 10 |
| 2 | 1897-8 | Control | 3+ | 40 |
| 2 | 1901-8 | Control | 4 (profuse) | 50 |
| 2 | 1998-8 | Control | 2 (light) | 10 |
| 2 | 1899-8 | Control | 4+ | 100 |
| 2 | 1900-8 | Control | 4 | 75 |
| 2 | 1903-8 | Control | 4+ | 60 |
| 3a | 13008-8 | Control | 4 | 90 |
| 3a | 13025-8 | Control | 3 | 45 |
| 3a | 13024-8 | Control | 3 | 35 |

TABLE 1-continued

| Exp. no | Rabbit no | Treatment | Degree of adh | % adh to heart |
|---|---|---|---|---|
| 3b | 12558-8 | Control | 3 | 10 |
| 3b | 12564-8 | Control | 4 | 75 |
| 3b | 12592-8 | Control | 4 | 60 |
| 3b | 12591-8 | Control | 1 (none) | 30 |
| 4 | 12574-8 | Control | 4 | 100 |
| 4 | 12590-8 | Control | 4 | 85 |
| 4 | 12585-8 | Control | 3 | 30 |
| 4 | 12580-8 | Control | 3 | 25 |
| 5 | 11878-8 | Control | 3 | 50 |
| 5 | 11434-8 | Control | 4 | 100 |
| 5 | 13439-8 | Control | 3 | 35 |
| 4 | 12569-8 | 0,8 ml FYSKOSAL (0,15M NaCL) | 3 | 40 |
| 4 | 12577-8 | 0,8 ml FYSKOSAL | 4 | 75 |
| 5 | 13436-8 | Fyskosal | 4 | 80 |
| 5 | 13429-8 | Fyskosal | 2+ | 25 |
| 5 | 13435 | Fyskosal | 4 | 80 |
| 3a | 13010-8 | 0,8 ml 1% Na-hyaluronat | 2+ | 5 |
| 3a | 13016-8 | 0,8 ml 1% Na-hyaluronat | 3+ | 2 |
| 3a | 13017-8 | 0,8 ml 1% Na-hyaluronat | 1 | 0 |
| 3a | 13021-8 | 0,8 ml 1% Na-hyaluronat | 1 | 0 |
| 3b | 12559-8 | 0,8 ml 1% Na-hyaluronat | 1 | 0 |
| 3b | 12563-8 | 0,8 ml 1% Na-hyaluronat | 1 | 0 |
| 3b | 12565-8 | 0,8 ml 1% Na-hyaluronat | 1 | 0 |
| 3b | 12570-8 | 0,8 ml 1% Na-hyaluronat | 3 | 5 |
| 3b | 12573-8 | 0,8 ml 1% Na-hyaluronat | 1 | 0 |
| 3b | 12583-8 | 0,8 ml 1% Na-hyaluronat | 3 | 10 |
| 3a | 13009-8 | 0,8 ml 1% HA10% DX70 | 1 | 0 |
| 3a | 13018-8 | 0,8 ml 1% HA10% DX70 | 1 | 0 |
| 3a | 13014-8 | 0,8 ml 1% HA10% DX70 | 1 | 0 |
| 3b | 12561-8 | 0,8 ml 1% HA10% DX70 | 2+ | 2 |
| 3b | 12566-8 | 0,8 ml 1% HA10% DX70 | 1 | 0 |
| 3b | 12567-8 | 0,8 ml 1% HA10% DX70 | 1 | 0 |
| 3b | 12568-8 | 0,8 ml 1% HA10% DX70 | 1 | 0 |
| 3b | 12571-8 | 0,8 ml 1% HA10% DX70 | 1 | 0 |
| 3b | 12582-8 | 0,8 ml 1% HA10% DX70 | 1 | 0 |
| 4 | 12585-8 | 0,8 ml 0,5% HA10% DX70 + 3% DX1 | 3 | 50 |
| 4 | 12579-8 | 0,8 ml 0,5% HA10% DX70 + 3% DX1 | 1 | 0 |
| 4 | 12575-8 | 0,8 ml 0,5% HA10% DX70 + 3% DX1 | 2 | 5 |
| 4 | 12572-8 | 0,8 ml 0,5% HA10% DX70 + 3% DX1 | 3 | 1 |
| 4 | 11876-8 | 0,8 ml 0,5% HA10% DX70 + 3% DX1 | 1 | 0 |
| 4 | 12588-8 | 0,8 ml 0,5% HA10% DX70 + 3% DX1 | 3 | 3 |
| 4 | 12586-8 | 0,8 ml 10% DX70 | 2 | 40 |
| 4 | 12560-8 | 0,8 ml 10% DX70 | 3 | 20 |
| 4 | 12576-8 | 0,8 ml 10% DX70 | 3 | 20 |
| 4 | 11872-8 | 0,8 ml 10% DX70 | 3 | 35 |
| 4 | 12578-8 | 0,8 ml 10% DX70 | 3 | 40 |
| 4 | 12581-8 | 0,8 ml 10% DX70 | 3 | 65 |
| 5 | 13437-8 | 0,8 ml 1% HA5% DX70 | 2 | 5 |
| 5 | 13438-8 | 0,8 ml 1% HA5% DX70 | 1 | 0 |
| 5 | 13432-8 | 0,8 ml 1% HA5% DX70 | 1 | 0 |
| 5 | 13440-8 | 0,8 ml 1% HA5% DX70 | 1 | 0 |
| 5 | 13443-8 | 0,8 ml 1% HA5% DX70 | 3 | 20 |
| 5 | 11871-8 | 0,8 ml 1% HA5% DX70 | 1 | 0 |
| 5 | 11877-8 | 1,6 ml 0,5% HA | 2 | 1 |
| 5 | 13441-8 | 1,6 ml 0,5% HA | 1 | 0 |
| 5 | 13433-8 | 1,6 ml 0,5% HA | 3 | 35 |
| 5 | 13442-8 | 1,6 ml 0,5% HA | 1 | 0 |
| 5 | 10953-8 | 1,6 ml 0,5% HA | 2+ | 10 |

As is evident from the results above, the effect of dextran was not significantly different from that of the controls whereas hyaluronic acid alone had a distinct effect, although even in this group adhesions were recorded in 40% of the cases, albeit with limited surface attachment. However, in the group which received the composition according to the invention, it was possible to prevent adhesions in 90% of the cases and the only adhesion noted was very minor and located at the operation incision.

The compositions according to the invention have thus proved to have a surprising capability of preventing postoperative complications in the form of adhesions, and the result thus offers considerable promise for human trials.

References

Weiss C et al (1986) The role of Na-hylan in reducing postsurgical tendon adhesions Bull Hosp Jt Dis Orthop Inst 46(1), 9–15

Robison Robert J et al (1984) Prevention of Pericardial Adhesions with Dextran 70 The Annals of Thoracic Surgery 37(6), 488–490

Von Messmer K et al (1980) Anaphylaktoide Reaktionen nach Dextran Allergologie, Jahrgang 3, Nr 2/1980, Sonderausgabe, 17–24.

We claim:

1. A composition for use in surgical operations to prevent adhesions between tissue surfaces, said composition being an aqueous solution containing dextran in an amount of 7 to 20% and hyaluronic acid in an amount of 0.5 to 6%, the dextran having a weight average molecular weight within the range of 30,000 to 75,000 and the hyaluronic acid having a weight average molecular weight within the range 500,000 to 6,000,000.

2. A composition according to claim 1 which additionally contains a hapten dextran.

* * * * *